2,902,220
CONTROL APPARATUS FOR A PLURALITY OF
CONDITION CHANGING DEVICES

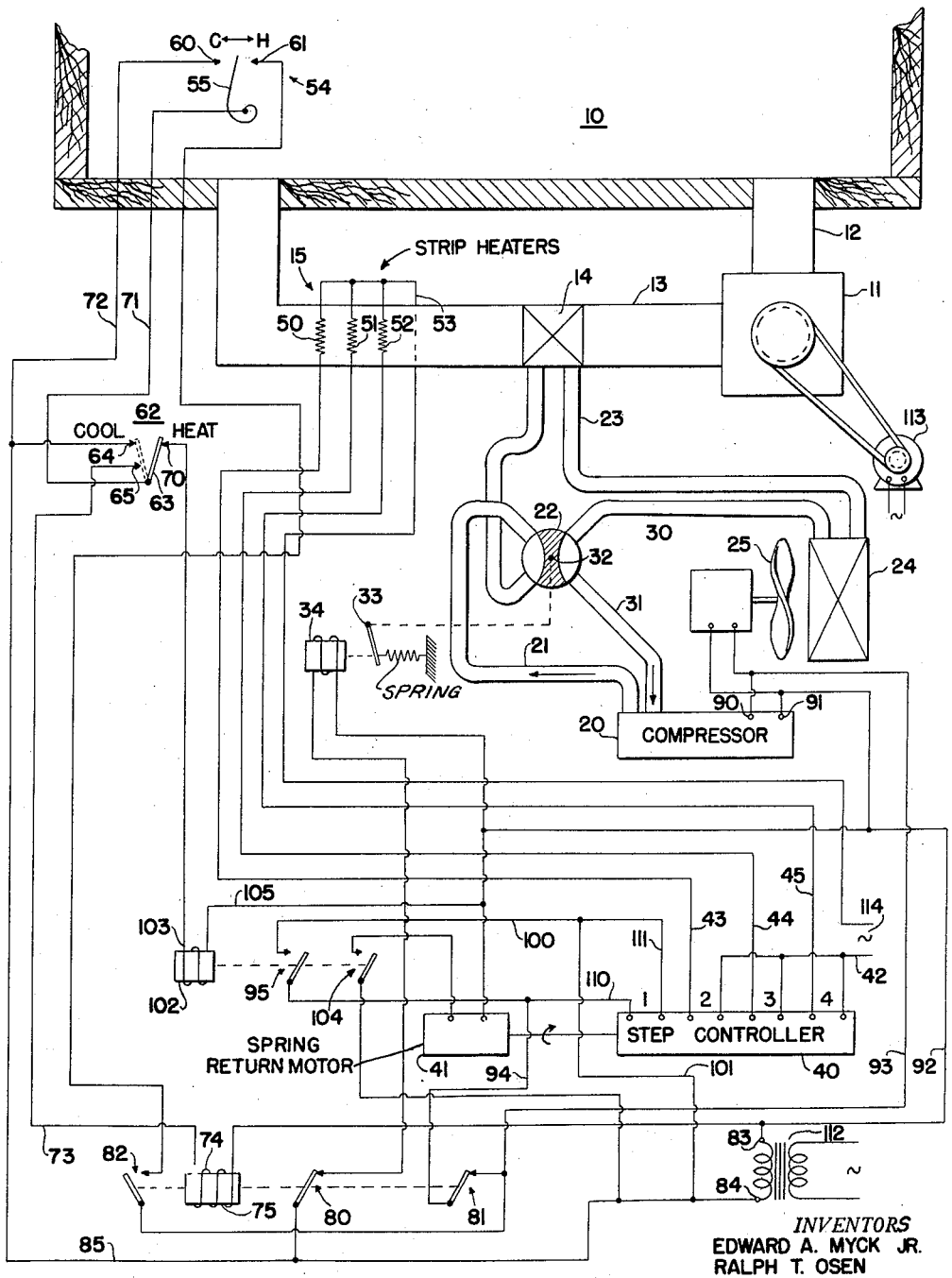

Edward A. Myck, Jr., Edina, and Ralph T. Osen, Golden Valley, Minn., assignors to Minneapolis-Honeywell Regulator Company, Minneapolis, Minn., a corporation of Delaware Application August 10, 1956, Serial No. 603,435

3 Claims. (Cl. 236—1)

The present invention is concerned with an improved control system particularly adapted to air conditioning apparatus wherein a temperature responsive device controls at least two temperature changing devices so that when the second temperature changing device is placed in operation the first temperature changing device is no longer under control of the temperature responsive means but remains in continuous operation.

It is conventional where a plurality of stages of heating are needed to use a step controller or sequencer which has a motor for driving apparatus to operate a plurality of switches in sequence. The switches are normally connected to the different stages of heating so that as the step controller motor rotates first one, then two, etc. stages of heating are energized. With such an arrangement it is almost impossible to have the first stage of heating turned on simultaneously with the operation of the control device, such as a thermostat. There inherently is some delay in the operation of the first switch of the step controller. While two stages of heating have generally been controlled by a two-stage thermostat, where more than two stages are needed a single thermostat to do the job would be quite complex and costly. Furthermore on subsequent stages with a staging thermostat the so-called "droop" which would necessarily exist in each of the stages is cumulative and the last stage would have a control point much below the desired level.

The present invention makes use of a thermostat for controlling a step controller and a condition changing device simultaneously. The first switch on the step controller is connected so that once the step controller is energized and driven beyond a predetermined position the thermostat no longer directly controls the first stage. As the condition responsive device further calls for a need of a change in the condition, the step controller is energized and the stages are turned on.

Such an invention is particularly desirous in home heating as to use a conventional step controller has several disadvantages, the main disadvantage being in the psychological area. When a home owner desires heat and increases the control point of a thermostat, an immediate operation of the heat furnishing device is expected to take place. With the step controller there inherently is a delay between the turning on of the thermostat and the operation of the first stage of heating connected to a step controller. In the present invention the first condition changing device is turned on in a normal manner when the thermostat calls for heat and at the same time the step controller is energized to initiate operation of the remaining stages of heating.

Where apparatus of this sort is used in connection with a heat pump installation, it is desirable to have the heat pump running the maximum amount of time. Any additional heat needed other than that obtained from the heat pump, it being auxiliary heat, is turned on only after the heat pump is "locked in" to provide continuous operation. It is thus seen that with such an invention the heat pump would run whenever heat was needed and any auxiliary heat would be furnished through the operation of the step controller.

It is therefore an object of the present invention to provide an improved air conditioning control apparatus.

It is another object of the present invention to provide in an air conditioning apparatus a device for controlling at least two condition changers, the device having a switch associated therewith for rendering continuous operation of the first condition changer just before the second condition changer has been placed in operation.

Other objects will become apparent upon the study of the specification and drawings of which:

A single figure is a schematic showing of the control system.

Referring to the single figure, an air conditioning system is shown for controlling the temperature in a space 10. Air is circulated by a fan 11 through return duct 12 and supply duct 13. Contained in the supply duct is a heat exchanger or coil 14 and a plurality of strip heaters 15. As the air passes through duct 13, heat is removed or added to the air to condition space 10.

The heat exchanger is connected into a conventional refrigeration system commonly known as a "heat pump" which, depending upon the connection of the refrigeration system, either memoves heat from the air by coil 14 or adds heat thereto. The refrigeration system comprises a compressor 20 having an exhaust or supply conduit 21 supplying compressed refrigerant through a valve 22 to the coil 14. Conduit 23 connects coil 14 and a second heat exchanger or coil 24 which has a fan 25 associated therewith for increasing its heat exchanging capacity. Coil 24 is connected by conduit 30 through valve 22 to the return line 31 of the compressor.

Valve 22 is a four-way valve which has a plug 32 connected to the armature 33 of a relay. When relay is energized the plug is rotated to change the flow of refrigerant from the path heretofore described so that the outlet of the compressor through conduit 21 is connected through conduit 30 to coil 24. It is thus seen by the operation of valve 22 either coil 14 or coil 24 can be made the condensing coil of the refrigeration system and the other coil is then the evaporator coil. As shown upon the operation of the compressor 20, coil 14 would deliver heat to the air passing therethrough however upon the energization of the relay to operate valve 22 coil 14 would act as an evaporator to take heat from the air passing therethrough.

A step controller 40 of a conventional type having a plurality of switches which close as a motor 41 connected to the step controller rotates a shaft thereof in a predetermined direction. The step controller has four switches which operate in sequence, the latter three being connected to control the energization of the strip heaters 15. The common terminals of each of the switches being connected too ne side 42 of a power source and the other terminal of the switches being connected by conductors 43, 44 and 45 to strip heaters 50, 51 and 52 respectively. The opposite extremity of the strip heaters is connected to the other side of the power source 114 by conductor 53. As the step controller rotates in a forward direction first strip heater 50 is energized and so on until all of the strip heaters are energized.

A thermostat 54 responsive to the space temperature has a bimetal 55 interposed between contacts 60 and 61. The thermostat is connected through a heat-cool switch 62 to the associated control circuit. The heat-cool switch has a movable member 63 which in the cool position engages contacts 64 and 65 and in the heat position engages contact 70. Member 63 is connected by a conductor 71 to bimetal 55 of the thermostat. Contact 64 is connected by conductor 72 to contact 60 of the thermostat.

Contact 65 of the switch is connected by conductor 73 to winding 74 of relay 75. The relay has normally closed switches 80 and 81 and a normally open switch 82 operated thereby. The other end of winding 74 is connected to a terminal 83 of a source of power. The other terminal 84 of the source of power is connected by a conductor 85 to terminal 64 of the heat-cool switch.

Compressor 20 has a pair of energization terminals 90 and 91. Terminal 91 is connected to terminal 83 of the source of power by conductor 92. Terminal 90 is connected through a circuit traced as follows; conductor 93, switch 81, conductor 94, switch 95, conductor 100, conductor 101 and back to terminal 84. Relay 102 which has an energization winding 103 closes its associated switches 95 and 104 when the relay is energized.

Winding 103 has one extremity connected to terminal 70 of the heat-cool switch. The other extremity is connected by conductor 105 and 92 to the terminal 83 of the source of power.

Switch 80 connects relay winding 34 between terminals 83 and 84 of the source of power so that upon energization of relay 75 relay 34 is de-energized. Member 33 is then pulled in a counterclockwise direction as shown by an associated return spring.

Motor 41 which drives the step controller is connected to the source of power between terminals 83 and 84 through switch 104 so that upon the energization of relay 102 the motor 41 is energized to drive the step controller in a forward direction.

The first switch of the step controller having output terminals 110 and 111 is connected in parallel with switch 95 so that the energization of circuit of the compressor can exist through switch 95 or the first switch of the step controller depending upon which is in the closed position.

*Operation*

Let us assume that power is supplied to the various power terminals of the circuit such as transformer 112, fan 113, and supply terminals 114 of the strip heaters. Relay 34 would then be energized through a circuit traced from terminal 84, switch 80, the relay winding, and back through conductor 92 to terminal 83. With the heat-cool switch in the heat position as shown so that member 63 engages terminal 70, relay 75 would be de-energized. Upon the energization of relay 34 member 33 would move in a clockwise direction to rotate plug 32 to connect conduit 21 so that coil 14 is the condenser of the refrigeration apparatus and coil 24 is the evaporator. Heat is then delivered to coil 14 and the air passing therethrough is heated.

Upon a call for heat by thermostat 54 when space 10 cools down and bimetal 55 engages contact 60, relay 102 is energized. Switch 95 then closes to energize compressor 20 through the circuit traced from terminal 83, conductor 92, terminal 91, conductor 90, conductor 93, switch 81, conductor 94, switch 95, conductor 100 and back to the source of power through conductor 101 to terminal 84. At the same time switch 104 is closed to energize motor 41 of the step controller through a circuit traced as follows: from terminal 84 of the source of power through switch 104, motor 41, and back to the source of power through conductor 92 to terminal 83. As the step controller is slow to operate, after a predetermined time the step controller switch between terminals 110 and 111 will close to shunt switch 95 and furnish a second energization circuit for the compressor. Should the thermostat still call for heat the step controller motor 41 will continue to rotate the step controller. The first strip heater 50 will be energized and then the second etc. depending upon the heating load as sensed by the thermostat. Let us assume that the step controller motor has rotated the step controller so that the first and second switches are closed, that is, the first strip heater 50 is energized. Should the thermostat then become satisfied and bimetal 55 move away from contacts 60 the step controller motor would be de-energized and by a spring return (not shown) it would slowly rotate in the opposite direction. Since the first switch of the step controller is effective to maintain the energization of the compressor, the heat pump system continues to operate even though the thermostat is satisfied.

It is thus seen that stages of heating are provided and yet the control by the thermostat has all of the attributes of a multistage thermostat as once the compressor of the heat pump is energized by the thermostat, it will remain energized until the heating load is such that no heat is required. As long as any of the strip heaters, that is, the additional stages of heat are energized, the first stage of heat which is furnished by the heat pump will remain energized. Furthermore, when the step controller is in its returned position and all of the stages of strip heater heat are de-energized it is obvious that upon a closing of the thermostat immediately the heat pump will start up. This is quite important from a psychological standpoint as a home owner in having a heating system of this type often goes to the thermostat when he wants heat. Upon turning the thermostat up, if something doesn't happen such as the heat pump starting up immediately, a suggestion that something is wrong is experienced. With the present invention the heat pump would be immediately started up and this psychological factor is omitted.

The control system also provides for cooling when the heat-cool switch is thrown to the left. Valve 22 upon operation of relay 34 is rotated in such a manner that the coil 14 acts as an evaporator to remove heat from the air that passes therethrough. The step controller 40 and the associated strip heaters has no function during the cooling operation of the system.

Assuming that the temperature in space 10 increased above a selected temperature so that cooling was desired, bimetal 55 moves to engage contact 61. This energizes the compressor through a circuit as follows: from contact 61, switch 82 of relay 75, conductor 93, the compressor, conductor 92, the secondary of transformer 112, conductor 85, contact 64, conductor 71, and back to the thermostat. Since the valve 22 is now in a position to make the coil 14 an evaporator coil, heat is taken from the air as it passed through the coil from space 10.

While the invention has been disclosed in the form of apparatus for controlling an air conditioning system it is obvious to one skilled in the art that there are other applications. Thus it is intended that the invention only be limited by the scope of the appended claims in which we claim:

1. In air conditioning apparatus having means to heat a space including a heat pump and a plurality of auxiliary electrically operable heat furnishing means, motor driven switch means having a plurality of switches which are operated to close in sequence upon energization of said motor, a first switch of said plurality of switches closing after a predetermined forward movement of said motor, temperature responsive switch means responsive to the temperature of said space, relay means having a coil and a pair of switches operated thereby, a source of power, means connecting the coil of said relay means through said temperature responsive switch means to said source of power, motor means for driving said heat pump, means including said first switch of said relay means for connecting said motor means and said motor driven switch means to said source of power whereby upon the call for heating by said temperature responsive switch means the heat pump is energized and heat is furnished to the space, means connecting said first of said plurality of switches in parallel with said first switch of said relay means so that upon a call for heat and said motor driven switch means being driven in a forward direction beyond said predetermined movement, said heat pump is maintained in operation until said motor driven switch means returns to a position before said predetermined movement, and means including the remaining of said plurality of switch means for sequentially connecting said plurality of heat furnishing means to said source of power upon continued operation of said motor driven switch means, and means to slowly return said motor driven switch means to its initial position upon satisfaction of said call for heat.

2. In air conditioning apparatus having a heat pump for furnishing heat to a space, motor means for driving the heat pump, temperature responsive means responsive to space temperature, a plurality of auxiliary heat furnishing devices to supplement said heat pump in heating the space, a motor driven step controller having a plurality of switches operated in sequence when the motor is energized, means to return said motor to operate said plurality of switches in a reverse order, first means connecting said motor means for the heat pump and said step controller motor to said temperature responsive means so that upon a call for heat the heat pump is instantaneously energized and said step controller is energized to operate said plurality of switches in sequence, means connecting said plurality of switches to control said plurality of auxiliary heat furnishing devices, and circuit means associated with a first operated switch of the plurality of said step controller for providing an energizing circuit for the heat pump whenever said step controller is advanced beyond an initial predetermined position to maintain said heat pump energized even though said temperature responsive means is satisfied and the energizing circuit established by said first means is broken.

3. In control apparatus for controlling a plurality of condition changing devices, condition responsive means, relay means having a coil and two associated switches, means connecting said condition responsive means to said coil of the relay means, first means for controlling one of the condition changing devices, a source of power, means including a first of said switches for connecting said first means to said source of power instantaneously upon a call for a change by said responsive means, second means for controlling another of said condition changing devices, means including a second of said switches for connecting said second means to said source of power, switch means, said switch means being closed when said second means has been repositioned from an initial position in the energized direction, and means connecting said last mentioned switch means in parallel with said first of said switches so that said first means is energized when said second means is repositioned said predetermined amount from said initial position in said energized direction even though said condition responsive means is satisfied.

References Cited in the file of this patent

UNITED STATES PATENTS

| | | |
|---|---|---|
| 1,970,584 | Stewart | Aug. 21, 1934 |
| 2,004,940 | Greenlee | June 18, 1935 |
| 2,083,585 | Winther | June 15, 1937 |
| 2,335,071 | Lynch | Nov. 23, 1943 |
| 2,700,505 | Jackson | Jan. 25, 1955 |
| 2,723,083 | Bary | Nov. 8, 1955 |